United States Patent
Choe et al.

(10) Patent No.: US 11,297,244 B2
(45) Date of Patent: Apr. 5, 2022

(54) CLICK-AND-LOCK ZOOM CAMERA USER INTERFACE

(71) Applicant: Samsung Electronics Co., Ltd., Suwon-si (KR)

(72) Inventors: Gyeongmin Choe, Plano, TX (US); Hamid R. Sheikh, Allen, TX (US); John SeokJun Lee, Allen, TX (US); Youngjun Yoo, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/947,274

(22) Filed: Jul. 27, 2020

(65) Prior Publication Data

US 2021/0250510 A1    Aug. 12, 2021

Related U.S. Application Data

(60) Provisional application No. 62/972,808, filed on Feb. 11, 2020.

(51) Int. Cl.
*H04N 5/232* (2006.01)
*H04N 5/262* (2006.01)

(52) U.S. Cl.
CPC ....... *H04N 5/23296* (2013.01); *H04N 5/2628* (2013.01)

(58) Field of Classification Search
CPC ......... H04N 5/232933; H04N 5/23296; H04N 5/2628; G06T 7/11; G06T 2207/20168; G06T 2207/20164; G06F 3/0484; G06F 3/04845; G06F 2203/04806; G06K 9/4614; G06K 9/4676; G06K 9/4671
See application file for complete search history.

(56) References Cited

U.S. PATENT DOCUMENTS

| | | | | |
|---|---|---|---|---|
| 8,319,883 | B2* | 11/2012 | Hada | H04N 5/2628 |
| | | | | 348/346 |
| 8,823,837 | B2* | 9/2014 | Kim | H04N 5/23296 |
| | | | | 348/240.2 |
| 9,204,053 | B2* | 12/2015 | Matsuzawa | H04N 5/232933 |
| 10,154,186 | B2* | 12/2018 | Kang | H04N 5/23212 |
| 10,462,374 | B2* | 10/2019 | Tsubusaki | H04N 5/23296 |
| 2003/0025812 | A1* | 2/2003 | Slatter | H04N 5/232945 |
| | | | | 348/240.2 |
| 2004/0120009 | A1* | 6/2004 | White | H04N 5/232933 |
| | | | | 358/1.18 |

(Continued)

FOREIGN PATENT DOCUMENTS

| | | |
|---|---|---|
| KR | 20100116040 A | 10/2010 |
| KR | 20130094493 A | 8/2013 |

OTHER PUBLICATIONS

Wang et al., "Video Salient Object Detection via Fully Convolutional Networks", IEEE Transactions on Image Processing, 2018, 12 pages.

*Primary Examiner* — Chiawei Chen

(57) ABSTRACT

A method includes receiving a selection of a selected zoom area on an input image frame displayed on a user interface; determining one or more candidate zoom previews proximate to the selected zoom area using a saliency detecting algorithm; and displaying the one or more candidate zoom previews on the user interface adjacent to the selected zoom area.

20 Claims, 14 Drawing Sheets

(56) References Cited

U.S. PATENT DOCUMENTS

| | | | | |
|---|---|---|---|---|
| 2009/0220160 | A1* | 9/2009 | Nara | H04N 5/23219 382/209 |
| 2010/0141826 | A1* | 6/2010 | Thorn | G03B 13/32 348/345 |
| 2010/0173678 | A1* | 7/2010 | Kim | H04N 5/23219 455/566 |
| 2010/0289937 | A1* | 11/2010 | Hada | H04N 5/23219 348/333.01 |
| 2011/0043662 | A1* | 2/2011 | Kim | G03B 17/00 348/240.2 |
| 2011/0141319 | A1* | 6/2011 | Watazawa | H04N 5/23229 348/240.2 |
| 2011/0304750 | A1* | 12/2011 | Lee | H04N 5/23293 348/240.99 |
| 2011/0316887 | A1* | 12/2011 | Fan | G06F 3/04886 345/661 |
| 2012/0105674 | A1* | 5/2012 | Sakaji | H04N 5/232935 348/229.1 |
| 2013/0235086 | A1* | 9/2013 | Otake | H04N 5/23296 345/660 |
| 2013/0329114 | A1* | 12/2013 | Kim | H04N 5/23293 348/333.12 |
| 2014/0059457 | A1* | 2/2014 | Min | G06F 3/0484 715/764 |
| 2014/0081956 | A1* | 3/2014 | Yuki | G06F 16/51 707/722 |
| 2014/0096074 | A1* | 4/2014 | Dojo | G06F 3/04812 715/788 |
| 2015/0146011 | A1* | 5/2015 | Tsubusaki | H04N 5/232945 348/169 |
| 2015/0324995 | A1* | 11/2015 | Yamamoto | G06K 9/4642 382/173 |
| 2016/0255268 | A1* | 9/2016 | Kang | G06F 3/04842 348/333.11 |
| 2016/0357415 | A1* | 12/2016 | Bovet | G06F 3/0488 |
| 2016/0381282 | A1* | 12/2016 | Bandlamudi | H04N 5/23296 348/240.3 |
| 2017/0034449 | A1* | 2/2017 | Eum | H04N 5/23216 |
| 2017/0046040 | A1* | 2/2017 | Wang | G06F 3/04817 |
| 2017/0104938 | A1* | 4/2017 | Shimosato | H04N 5/23296 |
| 2017/0272661 | A1* | 9/2017 | Tsubusaki | H04N 5/23296 |
| 2018/0069983 | A1* | 3/2018 | Cho | H04M 1/72469 |
| 2020/0026945 | A1* | 1/2020 | Asari | G06K 9/00785 |
| 2020/0259995 | A1* | 8/2020 | Ito | H04N 5/232127 |

* cited by examiner

CLICK-AND-LOCK ZOOM CAMERA USER INTERFACE

CROSS-REFERENCE TO RELATED APPLICATION AND PRIORITY CLAIM

This application claims priority under 35 U.S.C. § 119(e) to U.S. Provisional Patent Application No. 62/972,808 filed on Feb. 11, 2020. This provisional application is hereby incorporated by reference in its entirety.

TECHNICAL FIELD

This disclosure relates generally to imaging systems. More specifically, this disclosure relates to a click-and-lock zoom camera user interface.

BACKGROUND

Many mobile electronic devices, such as smartphones and tablet computers, include cameras that can be used to capture still and video images. These mobile electronic devices routinely support "zoom" functionality, which refers to an ability to optically or digitally enlarge objects within the cameras' fields of view. In some cases, "high zoom" functionality is provided that can provide up to fifty times (50×) optical or digital zoom, and this is expected to be much higher in the future.

SUMMARY

This disclosure provides a click-and-lock zoom camera user interface.

In a first embodiment, a method includes receiving a selection of a zoom area on an input image frame displayed on a user interface; determining one or more candidate zoom previews proximate to the zoom area using a saliency detecting algorithm; and displaying the one or more candidate zoom previews on the user interface adjacent to the zoom area.

In a second embodiment, an apparatus includes at least one memory configured to store an input image frame. The apparatus also includes at least one processor configured to receive a selection of a zoom area on an input image frame displayed on a user interface; determine one or more candidate zoom previews proximate to the zoom area using a saliency detecting algorithm; and display the one or more candidate zoom previews on the user interface adjacent to the zoom area.

In a third embodiment, a non-transitory computer readable medium contains instructions that when executed cause at least one processor to obtain an input image frame. The medium also contains instructions that when executed cause the at least one processor to receive a selection of a zoom area on an input image frame displayed on a user interface; determine one or more candidate zoom previews proximate to the zoom area using a saliency detecting algorithm; and display the one or more candidate zoom previews on the user interface adjacent to the zoom area.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
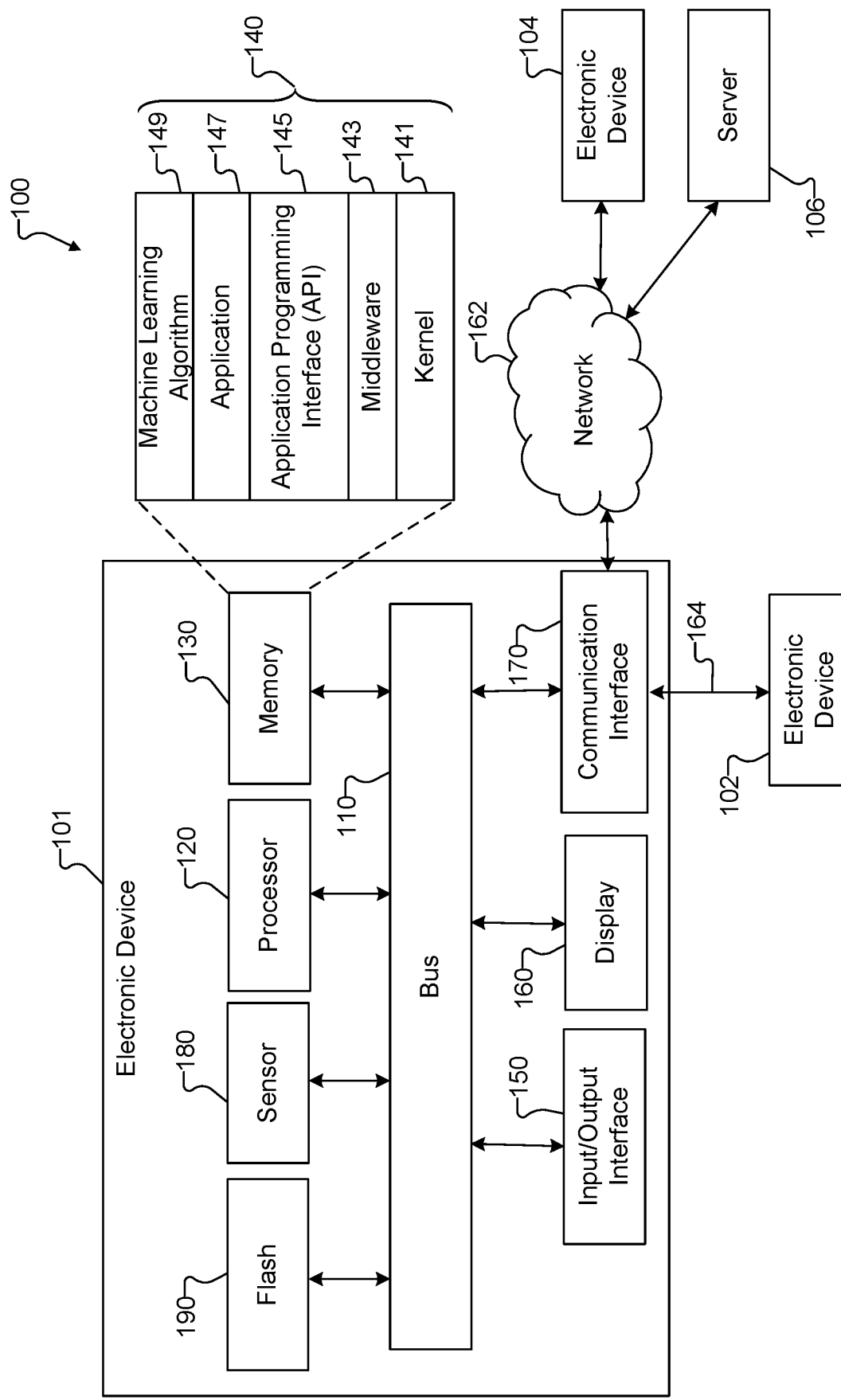
FIG. 1 illustrates an example network configuration including an electronic device in accordance with this disclosure.

FIGS. 1 through 8D, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, many mobile electronic devices routinely support "zoom" functionality, which refers to an ability to optically or digitally enlarge objects within a camera's field of view. In some cases, "high zoom" functionality is provided that can provide up to fifty times (50×) optical or digital zoom, and this is expected to be much higher in the future. This high zoom functionality is enabled, among other things, by continuously-improving resolutions that are supported by cameras of the electronic devices. Higher pixel densities of captured images allow for higher levels of zooming with reduced or minimal quality loss. However, while pixel densities are increasing, the electronic devices often have displays that remain generally the same or similar size. As images are captured from farther distances, visible details in the images become increasingly small. As a result, a user might find clicking on a specific target object of interest difficult when the target object is far away and relatively small on the display. Also, tracking a target object at an enhanced zoom level can be difficult, since even very small alterations of focus can drastically change an output image. In addition, it may be difficult for users to capture still or video images in which specific target objects are not located in the centers of the images.

This disclosure provides various techniques in which users are provided with candidate preview zooms from which the users can select desired outputs. This disclosure also provides various techniques for tracking user-selected target objects, which allows for maintaining targets in focus on a display even at high zoom levels. Once a target object is being tracked, the zoom level can be changed based on movement of the target object for improved or optimal capturing of images or viewing in high zoom. In some embodiments, an auto-telescope mode can provide users with captured zoomed shots automatically. Among other things, the various techniques described in this patent document enable the unique handling of high zoom scenarios. In high zoom cameras, for example, a target object can be very small in full preview (with 1× zoom). The techniques described in this patent document allow for precise selection and zoom-in at very high zoom levels, such as up to 50× zoom levels or more, on a target object while keeping the target object substantially in the center of preview. Tracking can be used to maintain the target object substantially in the center of preview over a wide range of zoom levels (such as from 1× zoom to 50× zoom or more), which helps to robustly frame the target object even when the electronic device or the target object is moving.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, a sensor 180, and a flash 190. In some embodiments, the electronic device 101 may exclude at least one of these components or may add at least one other component. The bus 110 includes a circuit for connecting the components 120-190 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In some embodiments of this disclosure, for example, the processor 120 can process image data and support a click-and-lock zoom camera user interface, which is described in more detail below.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, an application program (or "application") 147, and/or a machine learning algorithm 149. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, support the use of a click-and-lock zoom camera user interface. These functions can be performed by a single application or by multiple applications that each carries out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The machine learning algorithm 149 may be used as part of or in conjunction with one or more applications 147 that support the click-and-lock zoom camera user interface. As described below, the machine learning algorithm 149 may be used to produce an extracted salient map, which identifies at least one region of an input image frame containing salient information. The phrase "salient information" refers to image-related information that indicates an object based on contrast to surrounding regions in an image. For example, in the context of generating a salient map, salient information generally refers to a region or other collection of pixels contrasted with one or more surrounding areas within a scene. Thus, the machine learning algorithm 149 can (among other things) operate to accurately identify different objects within a scene.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first external electronic device 102, a second external electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101. The one or more cameras or other imaging sensors 180 can optionally be used in conjunction with at least one flash 190. The flash 190 represents a device configured to generate illumination for use in image capture by the electronic device 101, such as one or more LEDs.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments, the server 106 may execute one or more applications that, among other things, support a click-and-lock zoom camera user interface.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
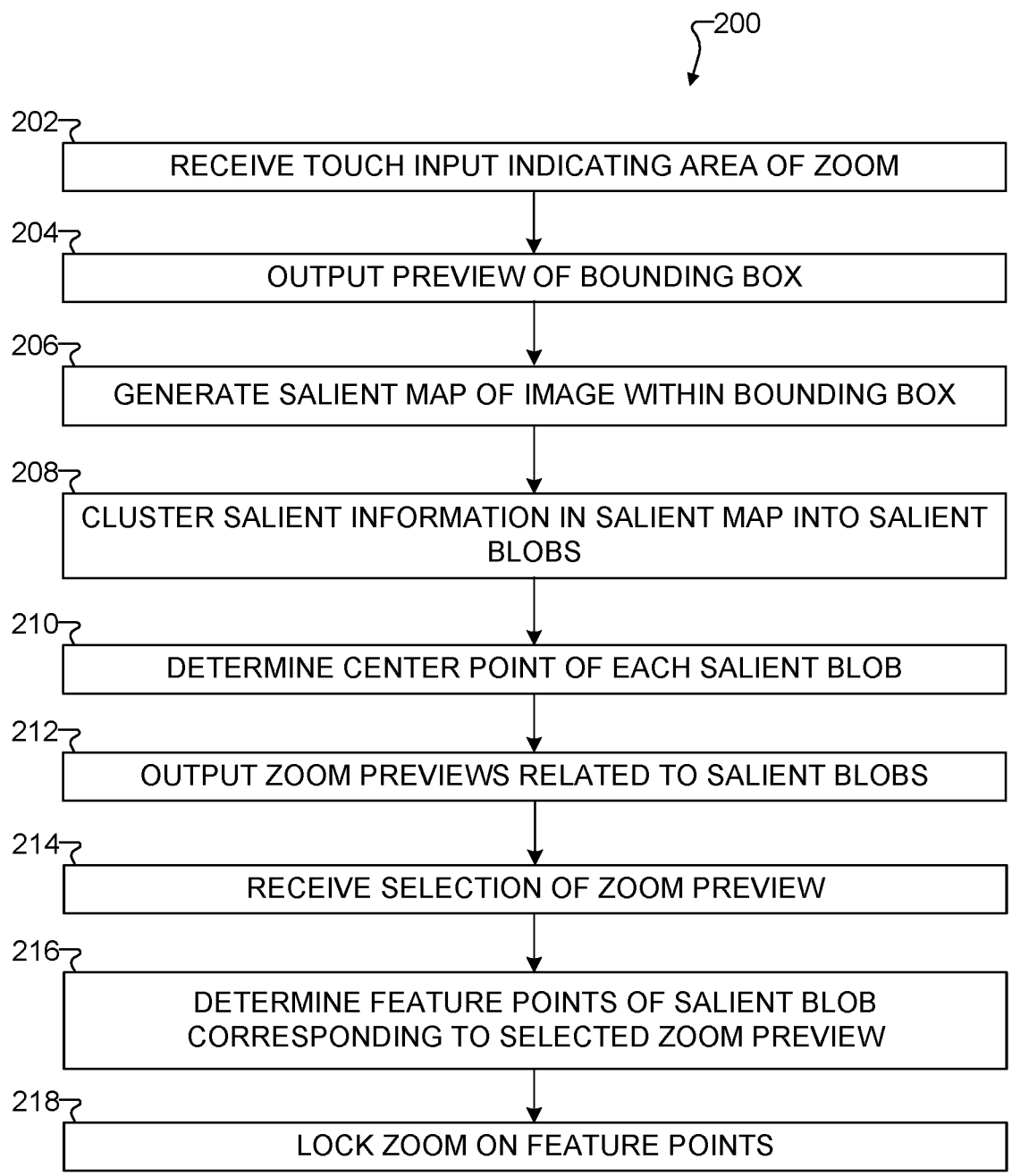
FIGS. 2A, 2B, 2C, 2D, 2E, 2F, 2G, 2H, and 2I illustrate an example method and related details for a manual preview zoom mode in a preview zoom user interface in accordance with this disclosure.

FIGS. 2A, 2B, 2C, 2D, 2E, 2F, 2G, 2H, and 2I illustrate an example method 200 and related details for a manual preview zoom mode in a preview zoom user interface in accordance with this disclosure. More specifically, FIG. 2A illustrates the method 200 that supports the manual preview zoom mode in the preview zoom user interface, and FIGS. 2B, 2C, 2D, 2E, 2F, 2G, 2H, and 2I illustrate example operations performed as part of the method 200. For ease of explanation, the method 200 is described as involving the use of the electronic device 101 in the network configuration 100 of FIG. 1. However, the method 200 could be used with any other suitable device and in any other suitable system.

In this example embodiment, a preview zoom user interface 222 of the electronic device 101 can display an input image frame 224. The preview zoom user interface 222 presents a user with a preview of an image that might be captured using the electronic device 101. The input image frame 224 represents a preview image frame that is captured by one or more cameras of the electronic device 101. The input image frame 224 can be displayed in response to the electronic device 101 receiving an input to capture one or more still or video images. The input image frame 224 can be constantly updated throughout the method 200 to show a current preview frame being captured by the one or more cameras of the electronic device 101. In some embodiments, the user interface 222 can support multiple user modes and settings, including a manual preview zoom mode 220.

This particular input image frame 224 is a preview image of a city skyline taken from a distant position. In the foreground of the input image frame 224 are a number of plants and stone barriers resembling a garden. In the background of the input image frame 224 are a number of buildings that may resemble skyscrapers or office buildings. The top portion of the input image frame 224 includes the sky and contains clouds that do not have many identifiable or discernable details outside of the cloud boundaries.

Figure 2B:
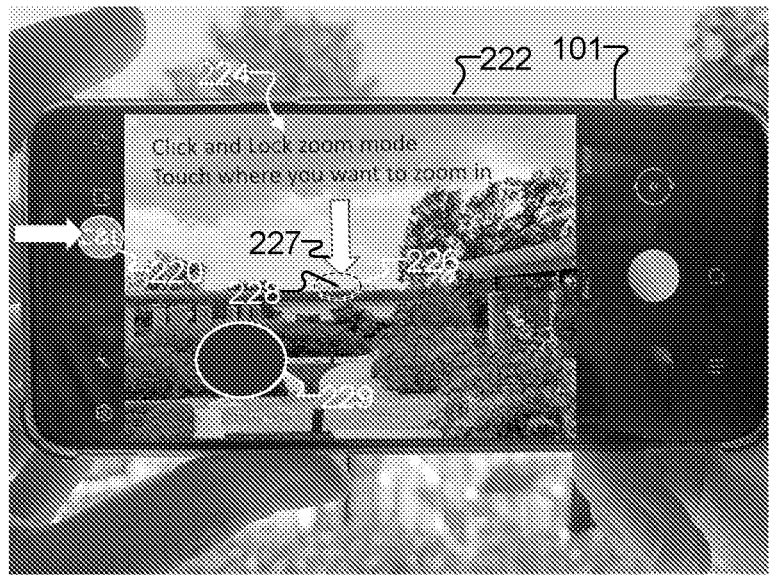

As shown in FIGS. 2A and 2B, a zoom area 226 is received by the electronic device 101 at step 202. The zoom area 226 represents an area of the input image frame 224 that a user selects for locking. In some cases, the zoom area 226 can be selected by the user contacting the user interface 222, where a position of contact is indicated by a cursor 227 in FIG. 2B (note that the cursor 227 may or may not actually be visible on the user interface 222). The contact on the user interface 222 may involve direct contact by a user (such as when the user uses his or her finger to make contact) or contact by a tool used to interact with the user interface 222. As part of step 202, the electronic device 101 can estimate a center point 228 of the zoom area 226. Also, in some cases, the zoom area 226 can be recorded before performing an analysis of the input image frame 224 for specific objects or details. In particular embodiments, the electronic device 101 can include a touch pad 229 for moving the cursor 227 on the input image frame 224 to precisely select an intended target point for the zoom area 226, where the touch pad 229 can be manipulated to move the cursor 227 for a more accurate zoom area 226 and center point 228.

Figure 2C:
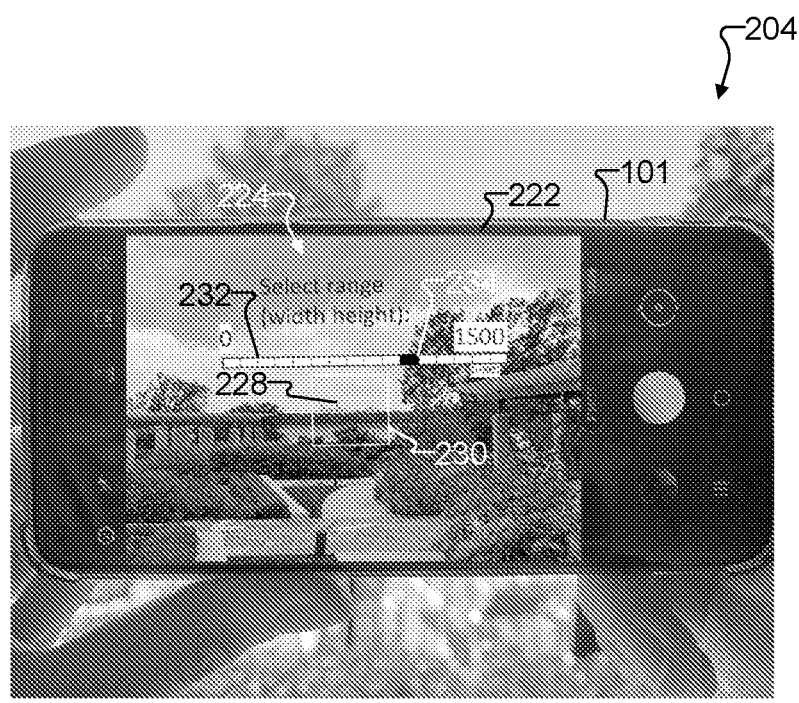

As shown in FIGS. 2A and 2C, a preview of a bounding box 230 is output to the user interface 222 of the electronic device 101 at step 204. For example, after receiving the zoom area 226, the electronic device 101 can output the bounding box 230 centered on the center point 228 in the input image frame 224. The bounding box 230 is a visual representation of the amount of the input image frame 224 that will be displayed across the entire user interface 222 after a zoom function is performed. In some cases, the bounding box 230 can be a square with a height dimension equal to a width direction, or the bounding box 230 can be a rectangle with a height/width ratio that is the same as or similar to a height/width ratio of the input image frame 224.

In this example, the size or dimensions of the bounding box 230 can be controlled by a zoom range 232, which represents a control that allows the user to vary the size or dimensions of the bounding box 230. The zoom range 232 can be continuously variable or segmented into pre-determined zoom options. The zoom range 232 can have units based on a number of pixels, percentage of the screen, etc. A zoom indicator 234 is displayed on the zoom range 232 to indicate the current selection of zoom. The position of the zoom indicator 234 on the zoom range 232 can be selected directly, or the zoom indicator 234 can be dragged to the right or left into the desired position. The bounding box 230 can be dynamically adjusted on the user interface 222 according to the movement of the zoom indicator 234 or based on other interactions of the user on the user interface 222. For example, the user could perform a pinch-in or pinch-out action on the user interface 222 at the bounding box 230 or at an arbitrary location on the user interface 222 to decrease or increase the size of the bounding box 230. Any user interaction to adjust the dimensions of the bounding box 230 can automatically update both the zoom range 232 and the bounding box 230.

Figure 2D:
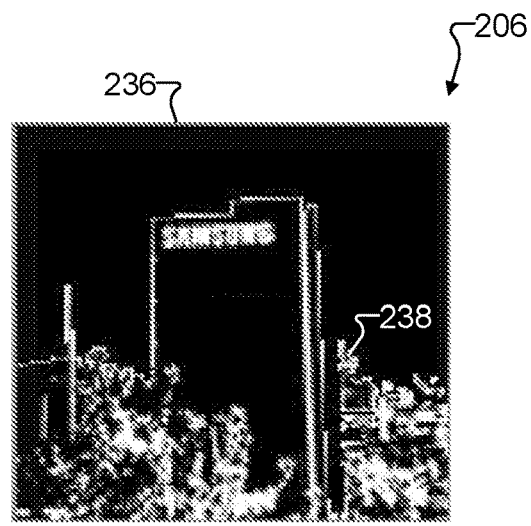

As shown in FIGS. 2A and 2D, the electronic device 101 generates a salient map 236 at step 206. For example, the input image frame 224, the center point 228, and the zoom size can be provided to the machine learning algorithm 149. The machine learning algorithm 149 processes the input image frame 224 in order to identify the region(s) containing salient information 238 in the input image frame 224. For example, the machine learning algorithm 149 may identify one or more regions or other collections of pixels in the input image frame 224, where each region or other collection includes pixels that provide salient information 238. The generated salient map 236 identifies the region(s) or other collection(s) of pixels in the input image frame 224 associated with the salient information 238. As described below, the machine learning algorithm 149 represents a trained machine learning model that uses artificial intelligence (AI) or other form of machine learning to identify regions or other collections of pixels containing salient information 238. The machine learning algorithm 149 may use any suitable machine learning model (now known or later developed), such as a neural network. One example implementation of the machine learning algorithm 149 is described below with reference to FIG. 3. Note, however, that the salient map 236 may be generated in any other suitable manner and is not limited to generation using machine learning.

Figure 2E:
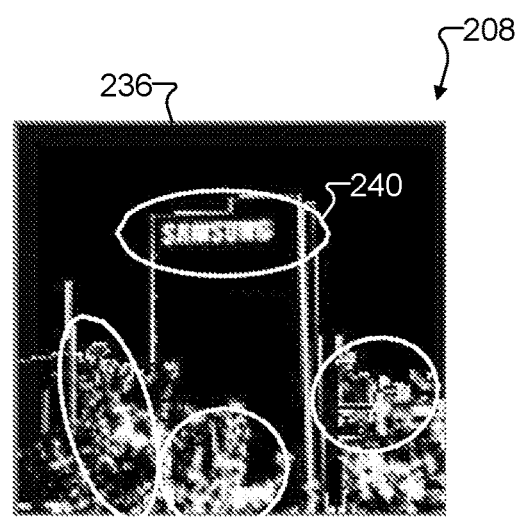

As shown in FIGS. 2A and 2E, the electronic device 101 clusters salient information 238 into one or more salient blobs 240 at step 208. A salient blob 240 represents a distinguishable cluster of salient information 238 in the salient map 236. One or multiple salient blobs 240 can be determined within a salient map 236 based on the image data being processed. In some cases, each salient blob 240 can be determined based on a cluster of contrast surrounded by no indication of contrast. Also, in some cases, and the salient blob 240 can have a minimum size or a maximum size when being determined. Thus, for instance, the electronic device 101 can determine that a cluster of salient information 238 is not large enough to meet the minimum size of a salient blob 240 or that a cluster may have too much salient information 238 to stay within the maximum for a salient blob 240. Alternatively, the electronic device 101 could take a cluster of salient information 238 and determine a highest amount of salient information 238 that would fit within a maximum for a salient blob 240 for the cluster.

Figure 2F:
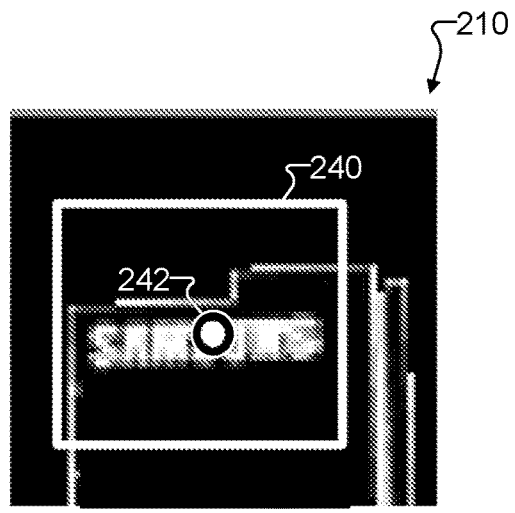

As shown in FIGS. 2A and 2F, a blob center point 242 is determined for each salient blob 240 at step 210. In some cases, each blob center point 242 can be determined based on the respective dimensions of the associated salient blob 240. For example, a height and width of the salient blob 240 can be measured, and the blob center point 242 can be determined based on a midpoint of the height and a midpoint of the width. The blob center point 242 can also be determined based on a weighted midpoint or using saliency density along each of the height and width. The weighted midpoint would skew towards a side with a greater density of salient information 238. The blob center point 242 is used to ultimately frame the bounding box 230.

Figure 2G:

As shown in FIGS. 2A and 2G, one or more candidate zoom previews 244 related to at least one salient blob 240 are output to the user via the user interface 222 at step 212. The zoom previews 244 represent enlarged versions of areas of the input image frame 224 corresponding to the salient blobs 240 (or versions of those areas of the input image frame 224 provided at a low zoom). The zoom previews 244 can be sized based on the number of zoom previews 244 and the available space within the display. The zoom previews 244 can also be sized based on a number of other factors, such as a default size, a ratio of the salient blob(s) 240 compared to the full display, etc. In some cases, the portions of the image frame captured in the zoom previews 244 can be still and not affected by movement of the electronic device 101. Also, in some cases, the input image frame 224 can be a still image while the zoom previews 244 are being displayed until a specific zoom preview 244 is selected. In cases where the image in the user interface 222 is a live image, the zoom previews 244 can be moved to different locations around the use interface 222 to not block the image features corresponding to the salient blob(s) 240. In other cases, the zoom previews 244 can be display proximately to the salient blob(s) 240 or the zoom area 226.

The user interface 222 can also include one or more preview bounding boxes 230, each of which marks the area of the input image frame 224 corresponding to one of the zoom previews 244 and one of the salient blobs 240. The bounding boxes 230 can use different colors, line patterns, or other indicators (which may also match different colors, line patterns, or other indicators of the zoom previews 244) for easier identification of the pairings between the zoom previews 244 and their respective bounding boxes 230. Leader lines 246 can also be implemented to provide easier identification of the pairings between the zoom previews 244 and their respective bounding boxes 230.

Figure 2H:
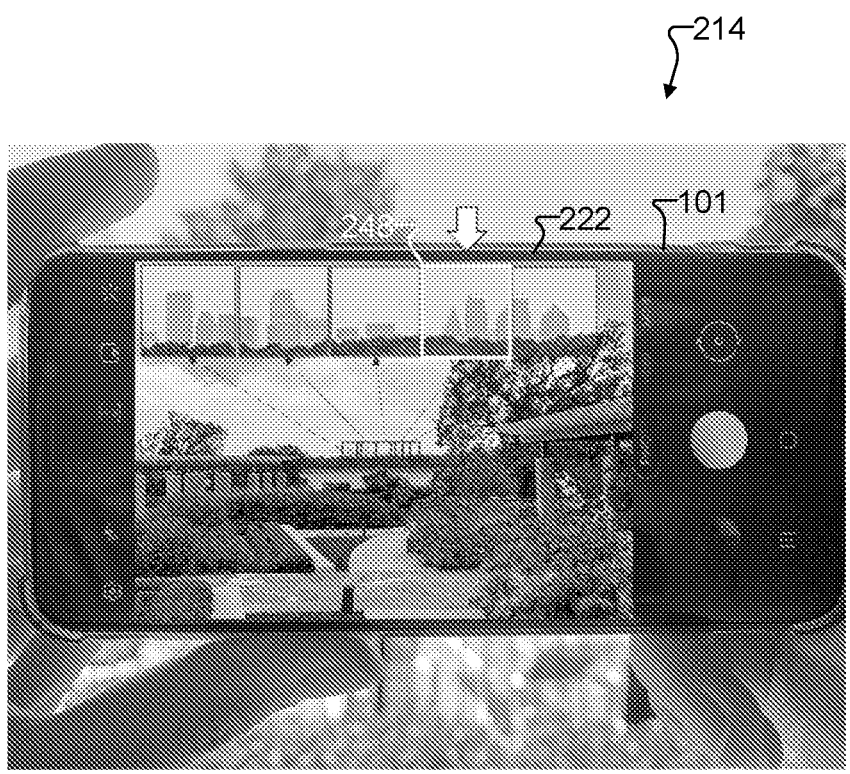

As shown in FIGS. 2A and 2H, a selection of a specific zoom preview 248 is received at step 214. The user can select the specific zoom preview 248 via the user interface 222, such as by touching the specific zoom preview 248 displayed in the user interface 222. The selected zoom preview 248 represents the zoom preview on which the user interface 222 will be locked.

Figure 2I:
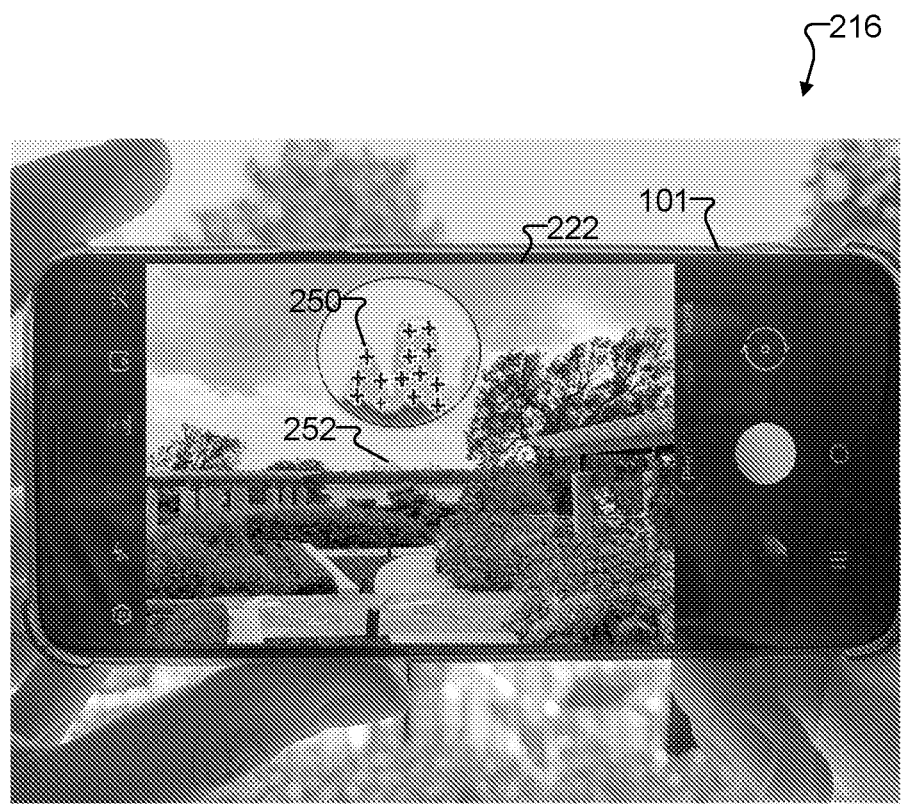

As shown in FIGS. 2A and 2I, the electronic device 101 determines multiple feature points 250 within the selected zoom preview 248 at step 216. The feature points 250 are associated with features of one or more objects contained within the selected zoom preview 248. The feature points 250 may be determined throughout the bounding box 230 corresponding to the selected zoom preview 248. The feature points 250 may be identified in any suitable manner, such as by using a Kanade-Lucas-Tomasi (KLT) feature tracker, a Harris corner tracker, an edge feature tracker, or convolution neural network (CNN) feature tracker. In some cases, the selected zoom preview 244 is run through a human detection algorithm, which (when the selected zoom preview 244 includes human pixels) regards face regions as preferred targets for identifying the feature points 250.

The electronic device 101 locks its zoom on the identified feature points 250 at step 218. For example, after calculating an optimal zoom rate, the input image frame 224 can automatically (and possibly gradually) zoom in to the selected zoom preview 248. Locking the zoom on the feature points 250 can also include tracking the feature points 250 when the input image frame 224 is moving. For instance, between successive image frames in a temporal image sequence, some feature points can be lost based on interference of sight lines, changes in reflections of light, etc. A percentage or threshold of feature points 250 can be set to maintain tracking. If the percentage or threshold is not attained, the electronic device 101 can request a new selected zoom preview 248 by detecting and displaying new zoom previews 244 in the zoom area 226.

Although FIGS. 2A, 2B, 2C, 2D, 2E, 2F, 2G, 2H, and 2I illustrate one example of a method 200 and related details for a manual preview zoom mode in a preview zoom user interface, various changes may be made to these figures. For example, while shown as a series of steps, various steps in FIG. 2A may overlap, occur in parallel, occur in a different order, or occur any number of times. Also, the contents of the images shown in FIGS. 2B, 2C, 2D, 2E, 2F, 2G, 2H, and 2I are merely examples intended to illustrate different operations or steps in the method 200 of FIG. 2A.

Figure 3:
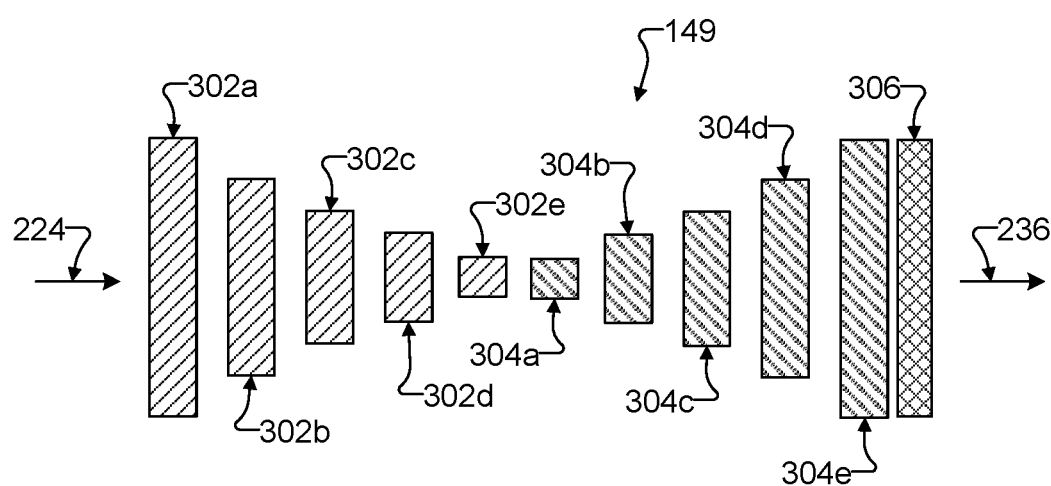
FIG. 3 illustrates an example salient information extraction machine learning algorithm for use with a preview zoom user interface in accordance with this disclosure.

FIG. 3 illustrates an example salient information extraction machine learning algorithm 149 for use with a preview zoom user interface in accordance with this disclosure. For ease of explanation, the machine learning algorithm 149 is described as being used as part of the method 200 of FIG. 2A. However, the machine learning algorithm 149 may be used in any other suitable method, including those described below.

As shown in FIG. 3, the machine learning algorithm 149 receives an input image frame 224 and passes the input image frame 224 through a collection of convolutional layers 302a-302e. Each convolutional layer 302a-302e applies a convolution function to its inputs in order to generate its outputs. A convolutional layer 302a-302e generally represents a layer of convolutional neurons, which apply a convolution function that emulates the response of individual neurons to visual stimuli. Each neuron typically applies some function to its input values (often by weighting different input values differently) to generate output values. A convolutional layer 302a-302e may be associated with an activation function, which can apply a specific function or operation to the output values from the neurons to produce final outputs of the convolutional layer. In this example, the first convolutional layer 302a receives and processes the input image frame 224, and each of the remaining convolutional layers 302b-302e receives and processes the outputs from the prior convolutional layer 302a-302d. The output of each convolutional layer 302a-302e has a lower resolution than its input. The output of the last convolutional layer 302e represents an encoding of the input image frame 224. Note that while five convolutional layers 302a-302e are shown here, the machine learning algorithm 149 may support any suitable number of convolutional layers.

The machine learning algorithm 149 then passes the encoded version of the input image frame 224 through a collection of deconvolutional or upsampling layers 304a-304e. Each deconvolutional or upsampling layer 304a-304e applies a deconvolution or upsampling function to its inputs in order to generate its outputs. In this example, the first deconvolutional or upsampling layer 304a receives and processes the encoded version of the input image frame 224 provided by the convolutional layer 302e, and each of the remaining deconvolutional or upsampling layers 304b-304e receives and processes the outputs from the prior deconvolutional or upsampling layer 304a-304d. The output of the last deconvolutional or upsampling layer 304e represents a decoded version of the encoded input image frame 224 produced by the convolutional layers 302a-302e. Note that while five deconvolutional or upsampling layers 304a-304e are shown here, the machine learning algorithm 149 may support any suitable number of deconvolutional or upsampling layers.

A softmax function layer 306 receives the decoded outputs representing the input image frame 224 from the deconvolutional or upsampling layer 304e. The softmax function layer 306 maps the decoded outputs (which are generally non-normalized values) to specified output classes (which are generally non-normalized values). Mathematically, the softmax function layer 306 can be said to map non-normalized outputs from the deconvolutional or upsampling layer 304e to a probability distribution over the specified output classes. Here, the output classes may refer to or represent different regions of the input image frame 224 containing salient information 238. Thus, for instance, the output classes may include different objects at different saliencies in the input image frame 224, where each salient grouping is associated with pixels having the same contrast or a small range of similar contrasts.

By passing the input image frame 224 through the layers 302a-302e, 304a-304e, 306, the machine learning algorithm 149 can produce a salient map 236 for the input image frame 224. The salient map 236 here can generally identify one or more regions of the input image frame 224 that contain salient information 238. The salient map 236 can then be used in any suitable manner, such as to guide the generation of zoom previews or to guide the production of other image-related data.

Although FIG. 3 illustrates one example of a salient information extraction machine learning algorithm 149 for use with a preview zoom user interface, various changes may be made to FIG. 3. For example, while shown as implementing a neural network, any other suitable machine learning algorithm or other algorithm may be used to identify salient information in input image frames.

Figure 4A:
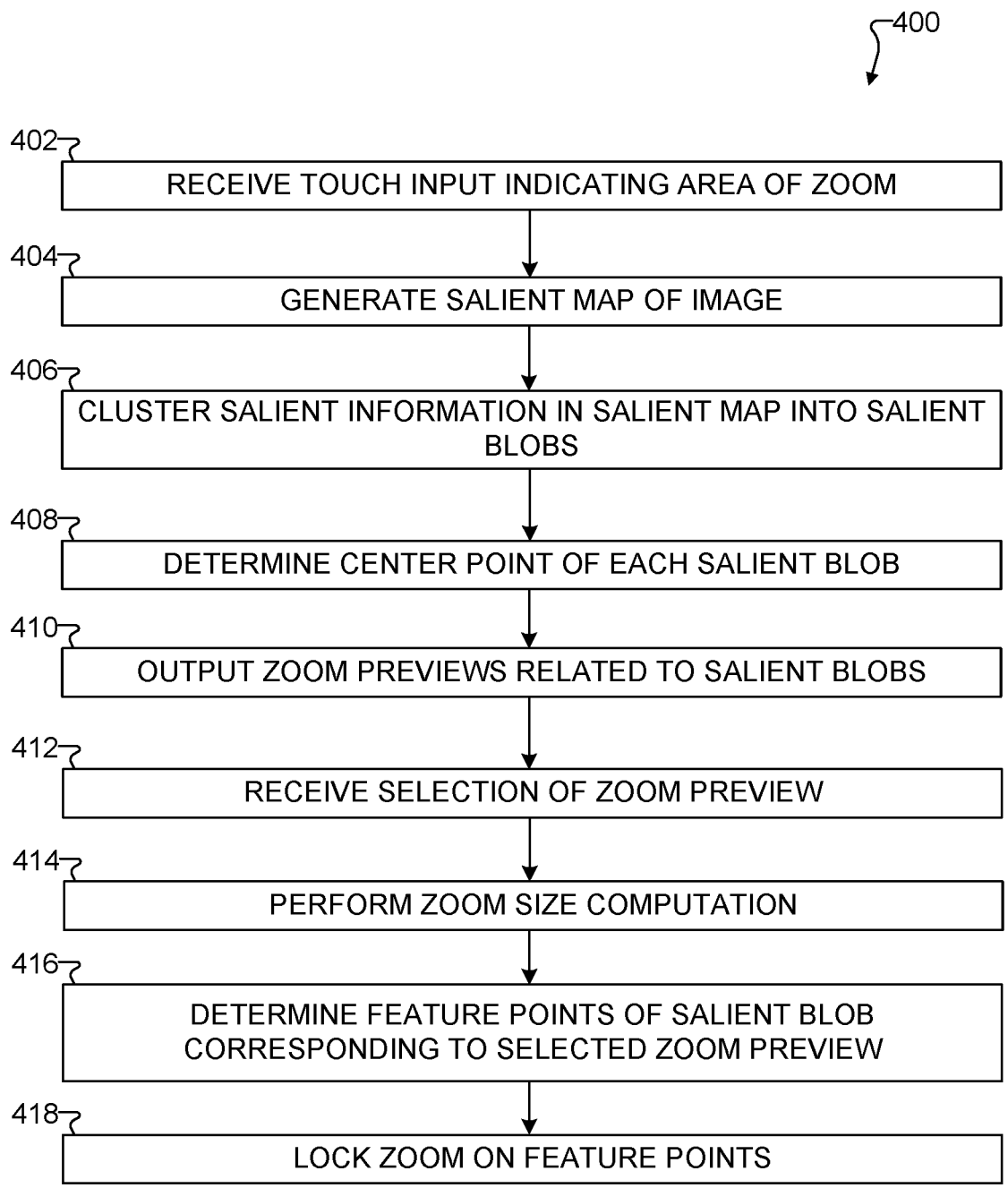
FIGS. 4A, 4B, and 4C illustrate an example method and related details for a user-selected auto zoom mode in a preview zoom user interface in accordance with this disclosure.
Figure 4B:
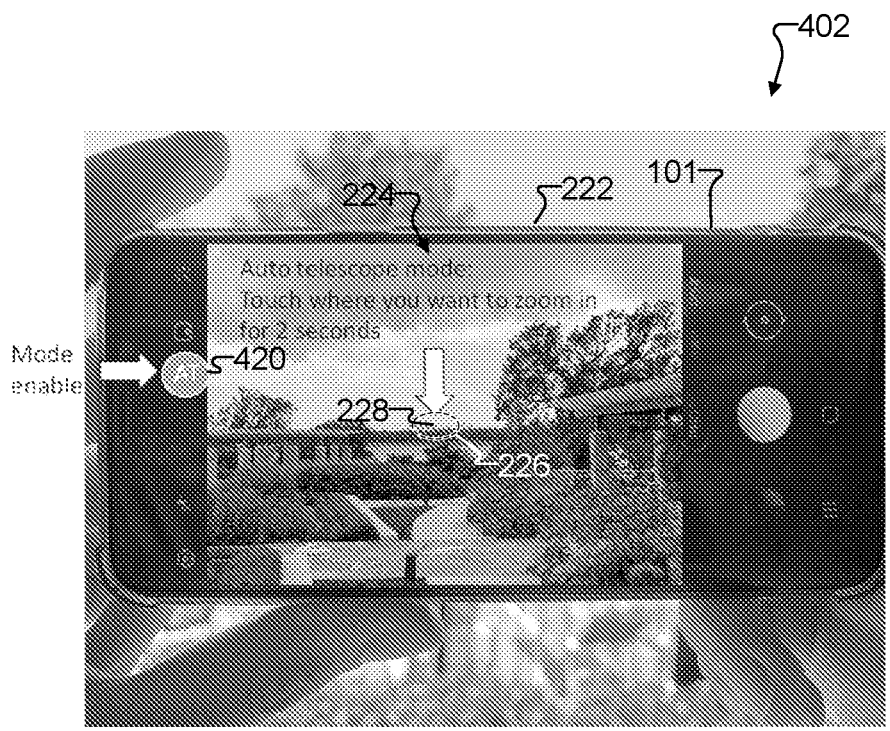
Figure 4C:
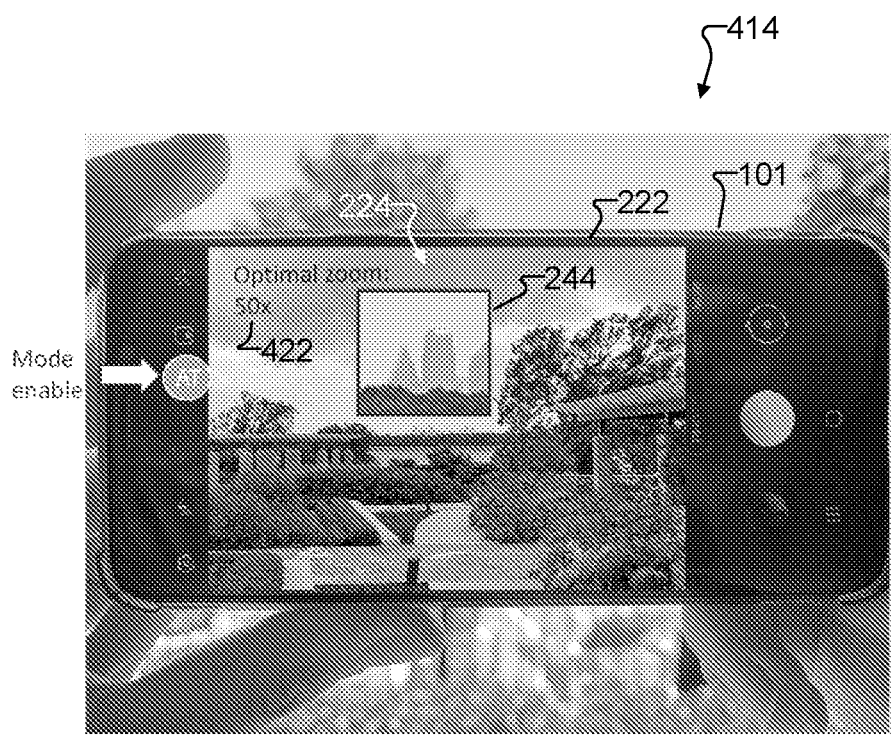

FIGS. 4A, 4B, and 4C illustrate an example method 400 and related details for a user-selected auto zoom mode in a preview zoom user interface in accordance with this disclosure. More specifically, FIG. 4A illustrates the method 400 that supports the user-selected auto zoom mode in the preview zoom user interface, and FIGS. 4B and 4C illustrate example operations performed as part of the method 400. For ease of explanation, the method 400 is described as involving the use of the electronic device 101 in the network configuration 100 of FIG. 1. However, the method 400 could be used with any other suitable device and in any other suitable system.

In this example embodiment, the preview zoom user interface 222 of the electronic device 101 can again display the input image frame 224. The input image frame 224 can be displayed in response to the electronic device 101 receiving an input to capture one or more still or video images. The input image frame 224 can be constantly updated throughout the method 200 to show a current preview frame being captured by the one or more cameras of the electronic device 101. In some embodiments, the user interface 222 can support multiple user modes and settings, including a user-selected auto zoom mode 420. The user-selected auto zoom mode 420 indicates that the electronic device 101 is going to automatically determine an optimal zoom 422 for use by the electronic device 101.

As shown in FIGS. 4A and 4B, a zoom area 226 is received by the electronic device 101 at step 402. Also, the electronic device 101 generates a salient map 236 at step 404, the electronic device 101 clusters salient information 238 into one or more salient blobs 240 at step 406, and a blob center point 242 is determined for each salient blob 240 at step 408. These steps 402, 404, 406, 408 may occur in the same or similar manner as the steps 202, 206, 208, 210 described above, except the salient map 236 may not be limited to any bounding boxes at this point. Because dimensions of a bounding box 230 are not selected by a user and used to limit the generation of the salient map 236 here, the generation of the salient map at step 404 can be altered relative to step 206. For example, in some cases, the number of salient blobs 240 to be incorporated in a salient map 236 can be predetermined in step 404. As a particular example, a threshold for the number of salient blobs 240 to be located can be predetermined based on a specific number of salient blobs 240, a number of pixels away from the center point 228, or a predefined bounding box 230. One or more candidate zoom previews 244 related to at least one salient blob 240 are output to the user via the user interface 222 at step 410, and selection of a specific zoom preview 248 is received at step 412. The one or more candidate zoom previews can be search for, such as starting from the center point 228 and expanding outward until a threshold has been reached.

As shown in FIGS. 4A and 4C, the dimensions of the bounding box 230 are automatically determined by the electronic device 101 at step 414. The electronic device 101 can compare a size of the bonding box 230 to the input image frame 224 to determine the optimal zoom 422. The electronic device 101 can determine that the optimal zoom 422 is 50 times zoom based on the bounding box 230 containing 1/50 of the pixels in the input image frame 224. Another method of determining a zoom ratio could be based on the measurements of the bounding box 230 to be optimized within the dimensions of the input image frame 224.

Each candidate zoom preview 244 can have a different amount or size of contents. Objects in an image are not normally of uniform size and depth in an image. The optimal dimensions of the bounding box 230 can be inversely proportional to a size of the salient blob 240. In particular embodiments, the optimal zoom ratio of the salient blob 240 can be expressed as follows:

$$R = c*(W/wb) \quad (1)$$

Here, R represents an optimal zoom ratio for a salient blob 240. Also, W represents a width of an input image frame 224 and wb represents a width of the salient blob 240. Furthermore, c is a float constant for determining margin and can be a number between 1 and 2.

Although FIGS. 4A-4C illustrates one example of a method 400 for a click and lock user-selected auto zoom, various changes may be made to FIGS. 4A-4C. For example, while shown as a series of steps, various steps in FIG. 4A may overlap, occur in parallel, occur in a different order, or occur any number of times.

Figure 5A:
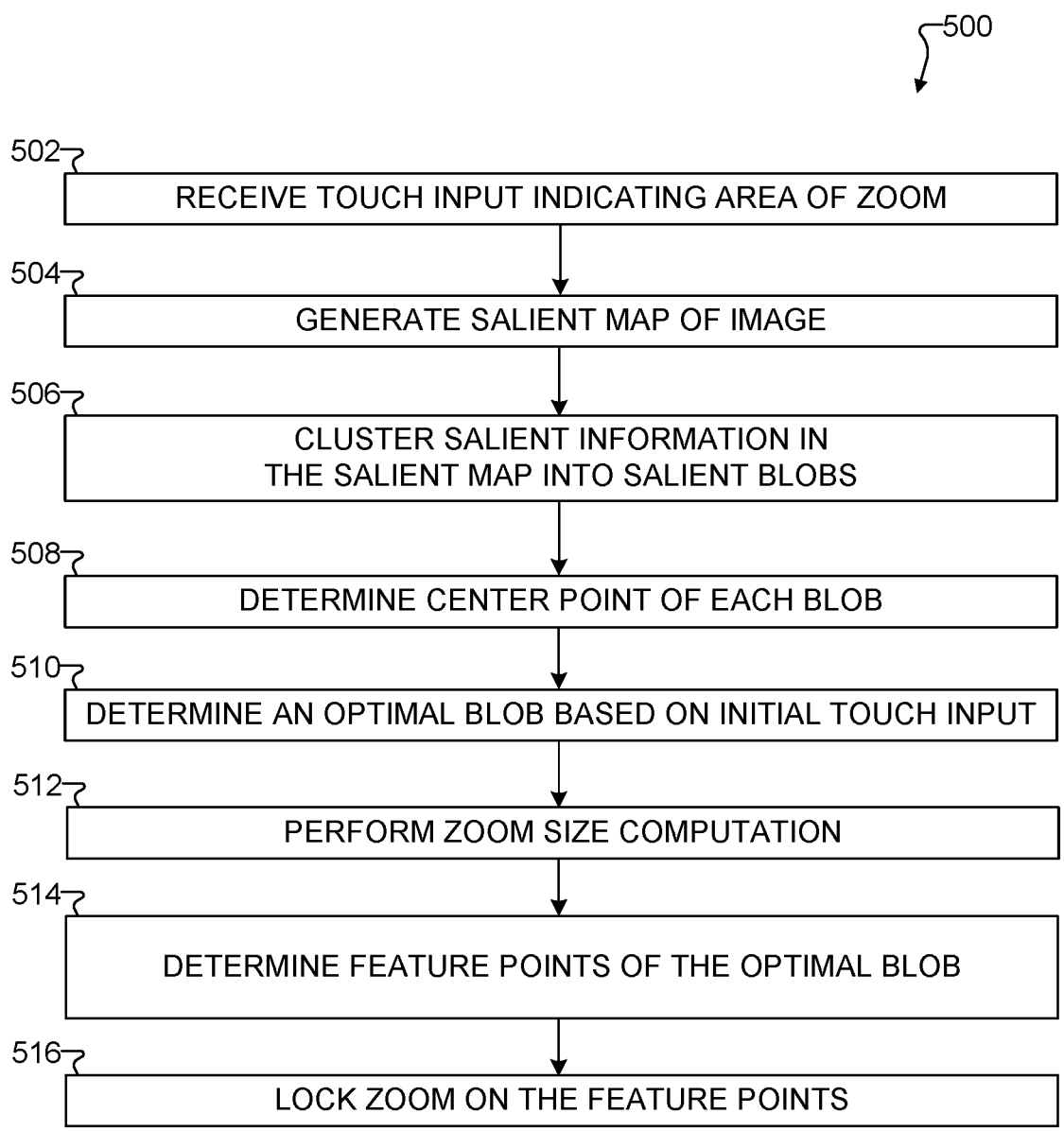
FIGS. 5A, 5B, and 5C illustrate an example method and related details for a fully auto zoom mode in a preview zoom user interface in accordance with this disclosure.
Figure 5B:
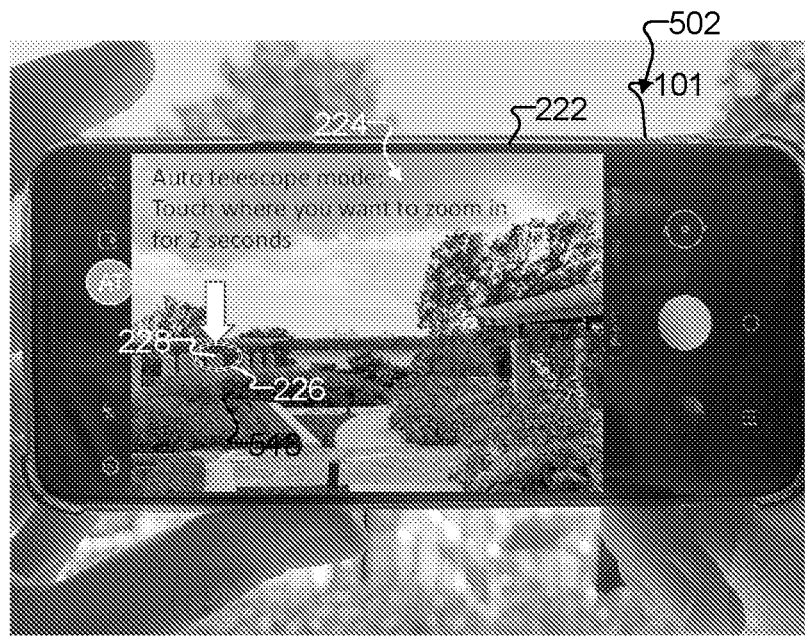
Figure 5C:
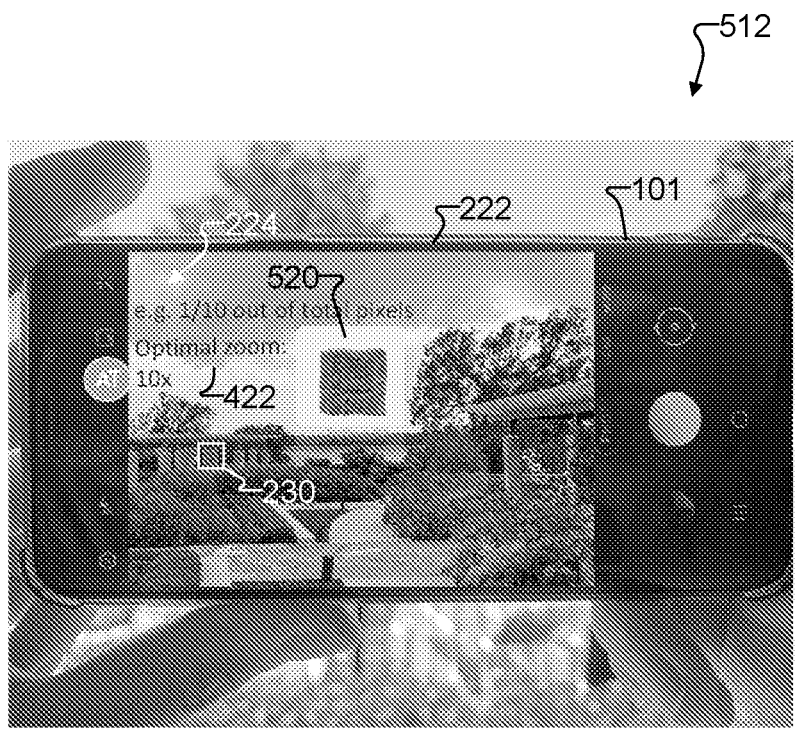

FIGS. 5A, 5B, and 5C illustrate an example method 500, including step 502 through step 516, for a fully auto zoom mode in a preview zoom user interface in accordance with this disclosure. More specifically, FIG. 5A is a flowchart of step 502 through step 516 for performing the method 500, FIG. 5B is an exemplary display for receiving a user selection on the zoom preview user interface 222 at step 502, and FIG. 5C is an exemplary display for outputting an optimal blob 520 on the user interface 222 at step 512. For ease of explanation, the method 500 shown in FIG. 5A is described as involving the use of the electronic device 101 in the network configuration 100 of FIG. 1, where the electronic device 101 can support the method 500 of FIG. 5A. However, the method 500 shown in FIG. 5 could be used with any other suitable device and in any other suitable system.

As shown in FIGS. 5A and 5B, the user interface 222 of the electronic device 101 can display an input image frame 224. The user interface 222 can also display multiple user modes and settings, including a fully auto zoom mode 518. The fully auto zoom mode 518 indicates that the electronic device is going to automatically determine an optimal zoom 422 and determine an optimal blob 520 while the electronic device 101 performs the method 500. In the method 500, the steps 502-516 are performed similarly to steps 402 through 418 in method 400, with a difference in the exclusion of steps 410 and 412 for outputting zoom preview related to each blob and receive a selection of a zoom preview.

In place of steps 410 and 412, the method 500 includes step 510 for determining an optimal blob based on the initial touch input. As shown in FIGS. 5A and 5C, an optimal blob 520 is determined based on the zoom area 226 and the salient map 236 at step 510. For example, multiple salient blobs 240 can be identified in the salient map 236. The optimal blob 520 is the cluster of salient information 238 that is determined by the electronic device 101 to be the selected object in the input image frame 224. The optimal blob 520 can be determined based on proximity to the center point 228, based on an amount of salient information 238 of the salient blob that is within the zoom area 226, etc. In some embodiments, the optimal blob 520 can be displayed on the user interface 222 as a single candidate zoom preview 248 for the user to accept, such as by a manual selection, or automatic selection after a delay without receiving further input from the user.

Although FIG. 5 illustrates one example of a method 500 for a fully auto zoom mode in a preview zoom user interface, various changes may be made to FIG. 5. For example, while shown as a series of steps, various steps in FIG. 5 may overlap, occur in parallel, occur in a different order, or occur any number of times.

Figure 6:
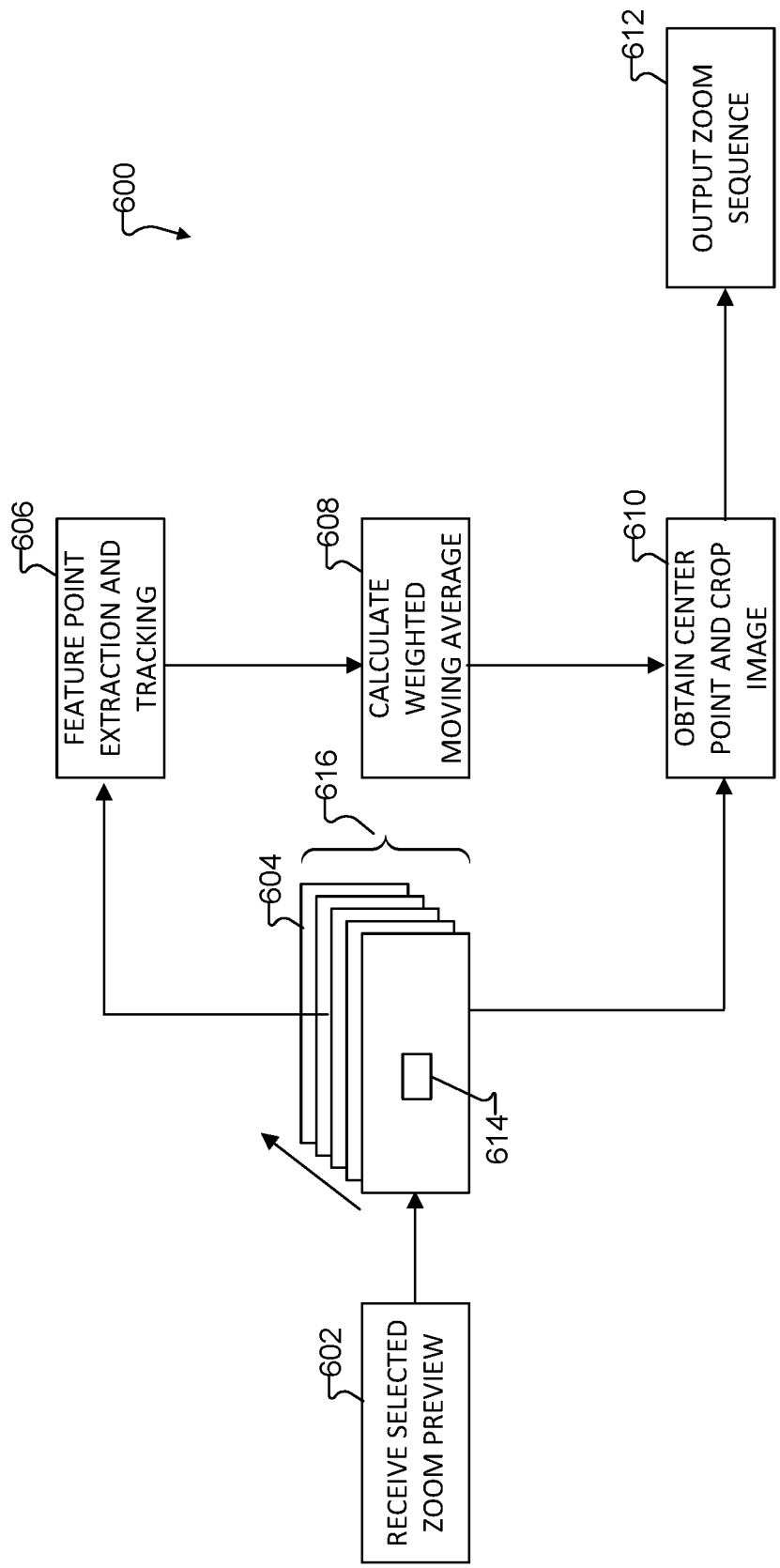
FIG. 6 illustrates an example process for implementing a click-and-lock zoom camera user interface in accordance with this disclosure.

FIG. 6 illustrates an example method 600 for a click-and-lock zoom camera user interface in accordance with this disclosure. For ease of explanation, the method 600 shown in FIG. 6 is described as involving the use of the electronic device 101 in the network configuration 100 of FIG. 1, where the electronic device 101 can support the method 200 of FIG. 2A, the method 400 of FIG. 4A, and the method 500 of FIG. 5A. However, the method 600 shown in FIG. 6 could be used with any other suitable device and in any other suitable system.

As shown in FIG. 6, a selected zoom preview 248 is received by the electronic device 101 at step 602. The selected zoom preview 248 can be selected from the zoom previews 244 or could be automatically determined as the optimal blob 520. A region of interest 614 can be determined based on a salient blob 240 corresponding to the selected zoom preview 248 or the optimal blob 520. The region of interest 614 is set through a temporal image sequence 616 at step 604. As each image in the temporal image sequence 616 can be slightly different, the region of interest 614 can be identified based on the salient blob 240 corresponding to the region of interest 614.

The feature points 250 within the region of interest 614 are determined and tracked at step 606. The determination and tracking of the feature points is described above in relation to steps 216 and 218 shown in FIG. 2A.

A weighted moving average is calculated for the temporal image sequence 616 at step 608. The electronic device 101 obtains a center point of the extracted features and the weight moving average is used to smooth the coordinates along the temporal image sequence 616. In particular embodiments, the weight moving average can be expressed as follows:

$$M_t = \frac{\sigma_{t=1}^n W_t * V_t}{\sigma_{t=1}^n W_t} \quad (2)$$

Here, M represents a smoothed coordinate along the temporal image sequence 616. Also, n represents a total frame number for the temporal image sequence 616, and t represents a frame index within the temporal image sequence 616. Furthermore, V represents a pixel coordinate for a feature point 250 and W represents a weight applied to the pixel coordinate for the feature point 250.

A center point of the feature points 250 is determined and the input image frame 224 is cropped to generate a zoomed output at step 610. The center point of the feature points 250 can be determined based on the outermost feature points 250 or a weighted average of all the feature points 250. Once the center point of the feature points 250 is determined, the input image frame 224 is cropped. The cropping of the input image frame 224 can occur based on the bounding box 230 of the selected zoom preview 248 or based on a display ratio. The cropped frame is then output in a zoomed sequence to the user interface 222 at step 612.

Although FIG. 6 illustrates one example of a method 600 for a click-and-lock zoom camera user interface, various changes may be made to FIG. 6. For example, while shown as a series of steps, various steps in FIG. 6 may overlap, occur in parallel, occur in a different order, or occur any number of times.

Figure 7:
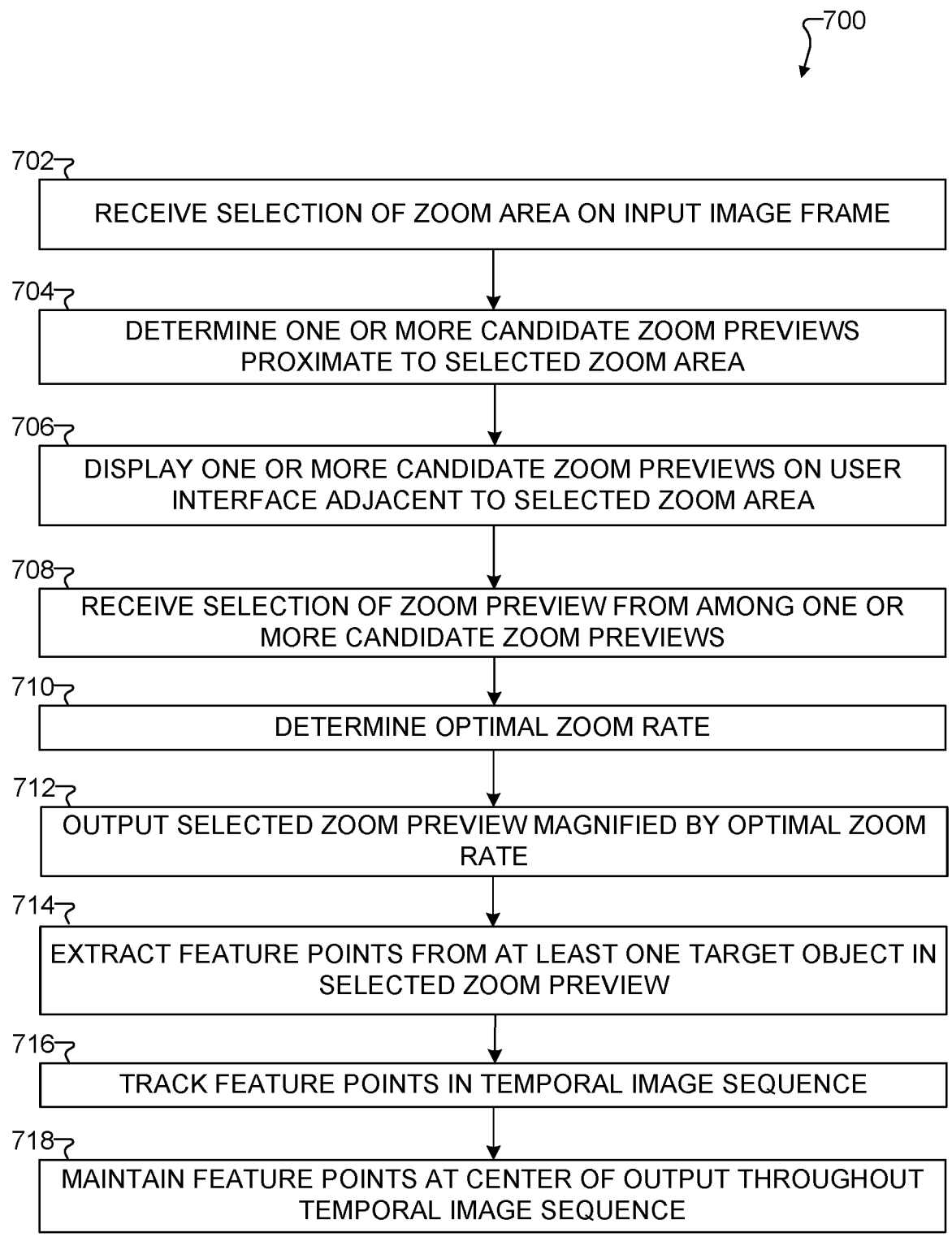
FIG. 7 illustrates an example method for a click-and-lock zoom camera user interface in accordance with this disclosure.

FIG. 7 illustrates an example method 700, including steps 702 through 712, for a click-and-lock zoom camera user interface in accordance with this disclosure. For ease of explanation, the method 700 shown in FIG. 7 is described as involving the use of the electronic device 101 in the network configuration 100 of FIG. 1, where the electronic device 101 can support the method 200 of FIG. 2A, the method 400 of FIG. 4A, the method 500 of FIG. 5A, and the method 600 of FIG. 6. However, the method 700 shown in FIG. 7 could be used with any other suitable device and in any other suitable system.

A selection of a zoom area 226 on an input image frame 224 displayed on a user interface 222 is received on the user interface 222 at step 702. The input image frame 224 can be captured by one or more image sensors 180 on the electronic device 101 or a separate camera that is currently transmitting to the electronic device 101. The zoom area 226 can be selected by direct contact on a touch screen by a user or by using a touch pad 229 to position a cursor 227. When a manual preview zoom mode 220 is selected, a bounding box 230 is presented on the user interface 222 at a center point 228 of the zoom area 226. A size of the bounding box 230 can be controlled by a zoom indicator 234 on a zoom range 232. When a user-selected auto zoom mode 420 or a fully auto zoom mode 518 is selected, the area for determining the candidate zoom previews 244 is automatically determined.

One or more candidate zoom previews 244 proximate to the zoom area 226 are determined using a saliency detecting algorithm 149 at step 704. The saliency detecting algorithm 149 receives the input image frame 224 and produces a salient map 236 including all the salient information 238 in the input image frame 224.

The one or more candidate zoom previews 244 are displayed on the user interface 222 adjacent to the zoom area 226 at step 706. The zoom previews 244 can have different zoom levels based on a size of each of the respective salient blobs 240. When a manual preview zoom mode 220 or a user-selected auto zoom mode 420 is selected, more than one zoom preview 244 can be displayed for the user to select on the user interface 222. When a fully auto zoom mode 518 is selected, a zoom preview 244 related to an optimal blob 520 can be presented. If the zoom preview 244 presented in the fully auto zoom mode 518, the user can start over or perform a function for a zoom preview 244 for the next optimal blob 520.

A zoom preview 244 of a selected zoom preview 248 is identified from the one or more candidate zoom previews 244 at step 708. The user can identify the selected zoom preview 248 by directly contact the candidate zoom preview 244 on the user interface 222.

An optimal zoom rate 422 is determined as an amount that is inversely proportional to a size of the zoom preview 244 for the selected zoom preview 248 in relation to a size of the input image frame 224 at step 710. The zoom rate 422 can include a sizing factor to provide a small amount of extra room around the outer edge of the zoom preview 244 to fully capture the selected zoom preview 248 and its surroundings.

The zoom preview 244 of the selected zoom preview 248 is magnified by the optimal zoom rate 422 to be output to a display 160 at step 712. The selected zoom preview 248 is displayed at a center of the display 160.

Feature points 250 from at least one target object 252 in the selected zoom preview 244 are extracted at step 714. A KLT feature tracker, a Harris corner tracker, an edge feature tracker, or CNN feature tracker could be used in identifying the feature points 250. In certain embodiments, the selected zoom preview 244 is run through a human detection algorithm. When the selected zoom preview 244 includes human pixels, face regions are regarded as preferred target for identifying feature points 250.

The feature points are tracked in a temporal image sequence at step 716. Locking the zoom on the feature points 250 includes tracking the feature points 250 when the input image frame 224 is moving. Between successive image frames in a temporal image sequence, some feature points can be lost based on interference of sight line, change in reflections of light, etc. The tracking can be maintained based on identifying a percentage or threshold of feature points 250 in a successive image frame in the temporal image sequence. If the percentage or threshold is not attained, then the electronic device 101 can request a new selected object 252 by detecting and displaying new zoom previews 244 in the general zoom area 226.

The feature points are maintained at a center of an output through the temporal image sequence at step 718. The electronic device 101 can automatically update the zoom rate and center point of salient blob based on the any changes identified during tracking. As the feature points either come together or move apart, the zoom rate would change and be updated to maintain a specific size of the feature object in the display. As the feature points are shifted in the input image frame, the center point of the salient blob would be adjusted.

Although FIG. 7 illustrates one example of a method 700 for a click-and-lock zoom camera user interface, various changes may be made to FIG. 7. For example, while shown as a series of steps, various steps in FIG. 7 may overlap, occur in parallel, occur in a different order, or occur any number of times.

Figure 8A:
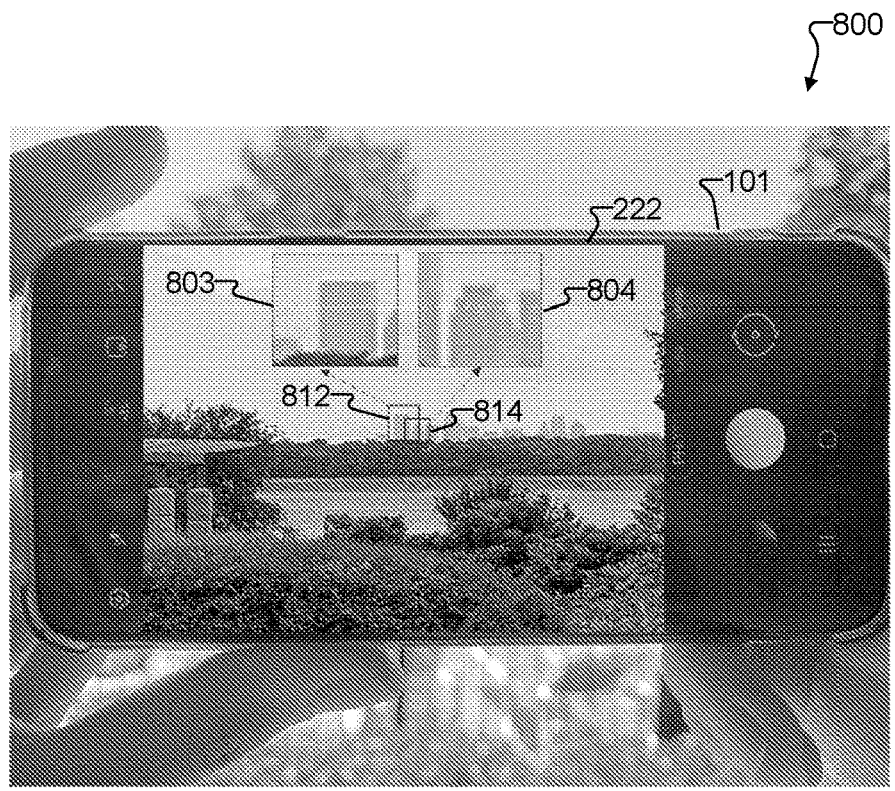
FIGS. 8A, 8B, 8C, and 8D illustrate example additional functionality for the preview zoom interface in accordance with this disclosure.
Figure 8B:
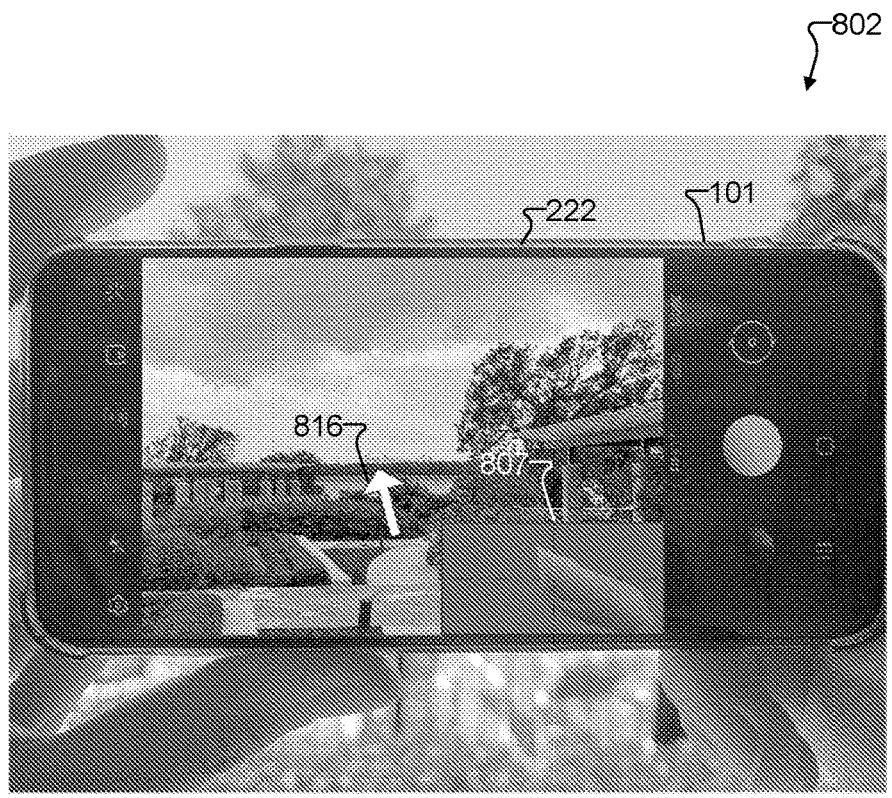
Figure 8C:
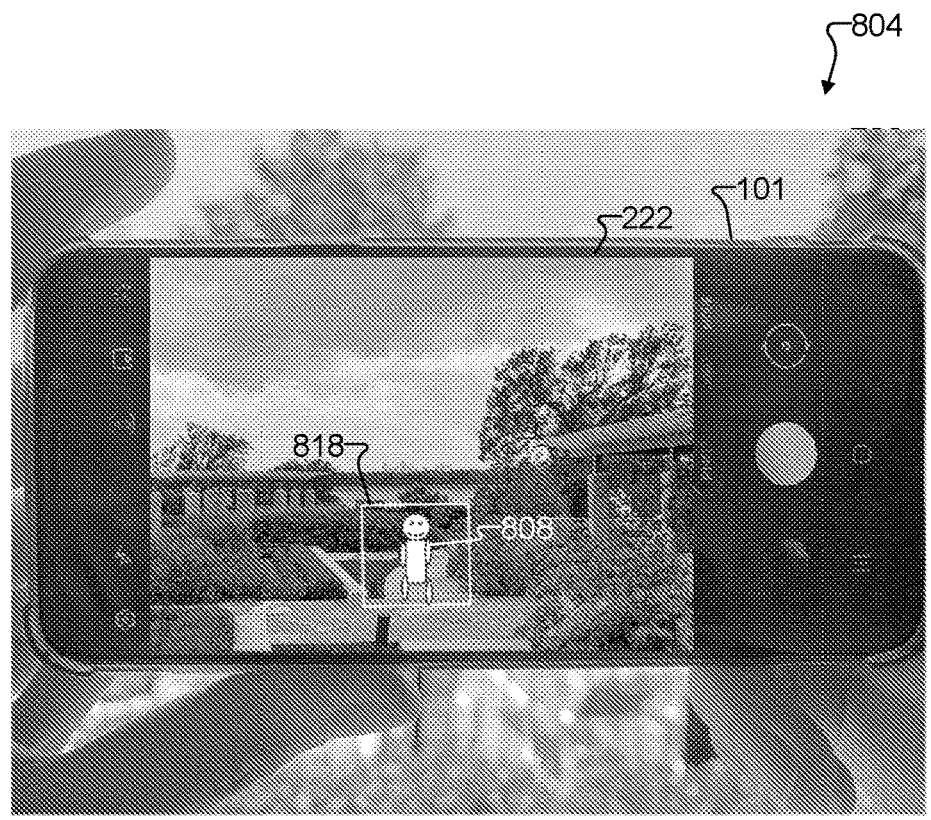
Figure 8D:
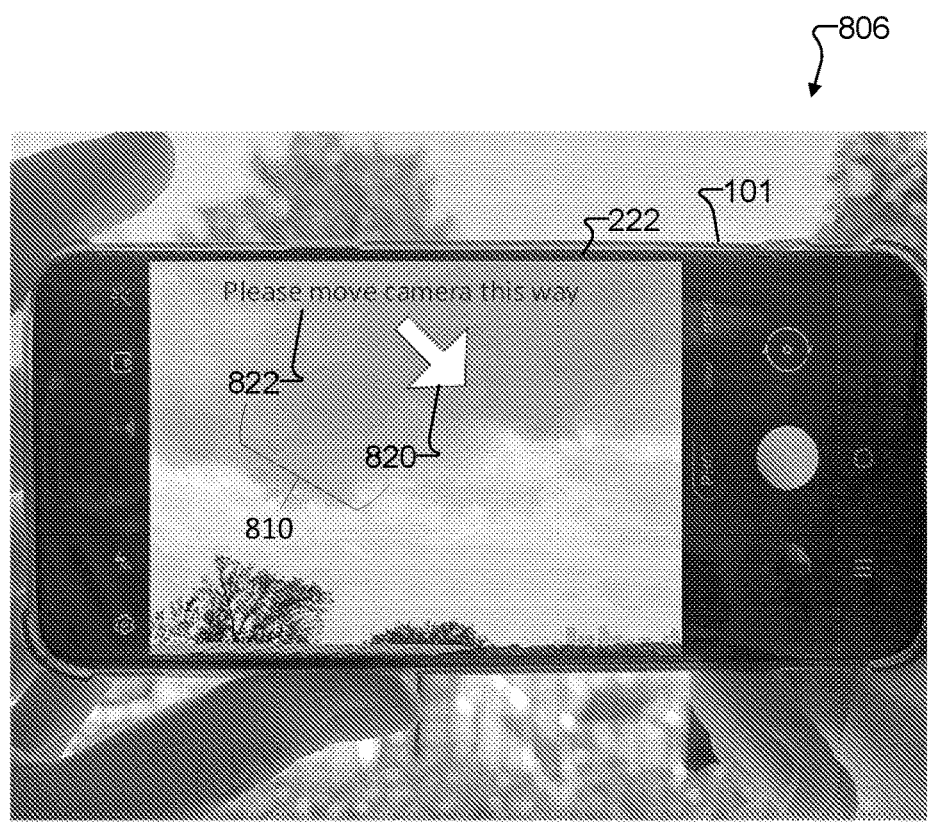

FIGS. 8A, 8B, 8C, and 8D illustrate example additional functionality 800, 802, 804, 806 for the preview zoom user interface 222 in accordance with this disclosure. More specifically, FIGS. 8A, 8B, 8C, and 8D illustrate additional functionality that can be performed as part of the method 200. Here, FIG. 8A illustrates the preview zoom user interface 222 displaying a first candidate zoom preview 803 and a second candidate zoom preview 804 at different magnifications. FIG. 8B illustrates the preview zoom interface 222 being precisely controlled through a touch pad 807. FIG. 8C illustrates the preview zoom user interface 222 automatically identifying a target object 808. FIG. 8D illustrates the preview zoom user interface 222 providing guidance 810 to a user when the target object 808 is out of the capture area of the image sensor 180. For ease of explanation, the additional functionality 800, 802, 804, 806 is described as involving the use of the electronic device 101 in the network configuration 100 of FIG. 1. However, the additional functionality could be used with any other suitable device and in any other suitable system.

As shown in FIG. 8A, the preview zoom user interface 222 is displaying the first candidate zoom preview 803 and the second candidate zoom preview 804 at different magnifications. In the input image frames 224, the size of an object on a display will depend on an actual size of the object and a distance of the object from the image sensor 180. Using a single size for multiple bounding boxes might produce objects that are not fully in the candidate preview or that include an excessive amount of unnecessary details with the candidate preview around the object. Using a single magnification with bounding boxes of different sizes might produce a clunky interface with completely different size zoom previews. Therefore, the preview zoom user interface 222 here can use a first bounding box 812 and a second bounding box 814 that have different sizes based on the detected salient blobs 240 of the target objects. In order to maintain a clean look on the preview zoom user interface 222, the magnification of the target object in the first candidate zoom preview 803 can be different from the magnification of the target object in the second candidate zoom preview 804. The magnification of the target object in the first candidate zoom preview 803 can be based on a difference between the size of the first bounding box 812 and a standardized size of the first candidate zoom preview 803 and the second candidate zoom preview 804. The magnification of the target object in the second candidate zoom preview 804 can similarly be based on a difference between the size of the second bounding box 814 and the standardized size of the first candidate zoom preview 803 and the second candidate zoom preview 804.

As shown in FIG. 8B, the preview zoom interface 222 can be precisely controlled using the touch pad 807. The touch pad 807 can, for example, represent an overlay that uses a portion of the preview zoom user interface 200. A cursor 816 can also be overlaid on the input image frame 224, and the cursor 816 can be controlled or manipulated based on a user's interaction with the touch pad 807. For instance, the cursor 816 can be moved to a point on the preview zoom user interface 200 based on a corresponding point of contact on the touch pad 807. The cursor 816 could also be adjusted based on movement from an initial point of contact, in which case the initial point of contact may have no effect on the cursor 816 until the point of contact moves. If the point of contact moves in a certain direction, the cursor 816 could be adjusted in the same direction. Also, the rate of movement of the cursor 816 may increase as the point of contact moves farther from the initial point of contact. In some cases, the touch pad 807 and/or the cursor 816 may remain hidden until the initial contact, and the initial contact could determine the location of the touch pad 807 (such as when the touch pad 807 is displayed centered on the initial point of contact). This may benefit the preview zoom interface by not covering a portion of the input image. The cursor 816 may also be displayed separately from the touch pad 807 and manipulated by the user interacting with the preview zoom user interface 222 without the touch pad 807. For instance, the user could have an initial point of contact on the preview zoom user interface 222 at any point, and the cursor 816 could move according to the movement of the user from that initial point of contact.

As shown in FIG. 8C, the preview zoom user interface 222 can perform automatic identification 818 of a target object 808. For example, the preview zoom interface 222 may use the machine learning algorithm 149 to automatically identify a target object 808 in an input image frame 224. The automatic identification 818 could incorporate any human, facial, or object recognition technique. The automatic identification 818 could also identify the target object 808 by determining that an object in the input image frame 224 is out of place or stands out relative to its surroundings or the environment. In some cases, the automatic identification 818 of the target object 808 can replace, supplement, or alter the operations of a user selection, such as steps 202-214 shown in FIG. 2A, steps 402-412 shown in FIG. 4A, step 502 shown in FIG. 5A, or steps 702-706 shown in FIG. 7.

As shown in FIG. 8D, the preview zoom user interface 222 provides guidance 810 to a user when a target object 808 is out of the capture area of the image sensor 180. For example, when the preview zoom interface 222 is zoomed up to high magnifications (such as greater than fifty times normal), slight movement of the electronic device 101 can cause significant movement in the displayed image. The preview zoom user interface 222 can identify when a target object 808 is close to an edge or has moved past an edge of the full input image frame 224. When either of these situations occurs, the preview zoom interface 222 can display at least one instance of guidance 810. The guidance 810 can include visual indicia 820 of a recommended direction of movement, such as an arrow. The guidance 810 can also include text 822 that describes the recommended movement in addition to the visual indicia 820 or separately from the visual indicia 820. In this example, the text 822 shown in FIG. 8D is used in addition to the visual indicia 820 to describe the recommended movement of the image sensor. Of course, other text 822 may be used, such as when the text 822 states a specific direction for movement like "Please rotate the top of the camera forward."

Although FIGS. 8A, 8B, 8C and 8D illustrate additional functionality 800, 802, 804, 806 for the preview zoom user interface 222, various changes may be made to these figures. For example, the contents of the images shown in these figures are merely examples intended to illustrate how different operations may occur.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
   receiving, using at least one processor, a selection of a zoom area on an input image frame displayed on a user interface;
   determining, using the at least one processor, one or more candidate zoom previews for one or more target objects proximate to the zoom area using saliency detection, each of the one or more candidate zoom previews associated with at least one bounding box around at least one specified one of the one or more target objects in the input image frame; and
   displaying, using the at least one processor, the one or more candidate zoom previews on the user interface adjacent to the zoom area and, for each of the one or more candidate zoom previews, the at least one bounding box around the at least one specified one of the one or more target objects in the input image frame.

2. The method of claim 1, wherein determining the one or more candidate zoom previews for the one or more target objects proximate to the zoom area comprises:
   displaying an initial bounding box on the zoom area and a zoom range adjacent to the zoom area;
   receiving an input on the zoom range for a dimension of the initial bounding box; and
   determining the one or more candidate zoom previews for the one or more target objects according to the dimension of the initial bounding box.

3. The method of claim 1, wherein determining the one or more candidate zoom previews for the one or more target objects proximate to the zoom area comprises:
   expanding a search for the one or more target objects related to the one or more candidate zoom previews from a center point of the zoom area until a threshold has been reached.

4. The method of claim 3, wherein:
   determining the one or more candidate zoom previews for the one or more target objects proximate to the zoom area comprises:
   determining an optimal blob, and
   determining a size of a bounding box for the optimal blob based on a size of the optimal blob; and displaying the one or more candidate zoom previews comprises displaying a candidate zoom preview including the optimal blob and the bounding box for the optimal blob in the input image frame.

5. The method of claim 1, further comprising:
receiving a selected zoom preview from the one or more candidate zoom previews;
determining an optimal zoom rate that is inversely proportional to a size of the selected zoom preview in relation to a size of the input image frame; and
outputting the selected zoom preview magnified by the optimal zoom rate.

6. The method of claim 1, further comprising
receiving a selected zoom preview from the one or more candidate zoom previews;
extracting feature points from the at least one specified one of the one or more target objects associated with the selected zoom preview;
tracking the feature points in a temporal image sequence; and
maintaining the feature points at a center of an output throughout the temporal image sequence.

7. The method of claim 1, wherein receiving the selection of the zoom area on the input image frame comprises:
displaying a touchpad on the user interface;
receiving a manipulation of the touchpad;
moving a cursor according to the manipulation; and
identifying the selection of the zoom area based on a location of the cursor on the input image frame.

8. An apparatus comprising:
at least one memory configured to store an input image frame; and
at least one processor configured to:
receive a selection of a zoom area on the input image frame displayed on a user interface,
determine one or more candidate zoom previews for one or more target objects proximate to the zoom area using saliency detection, each of the one or more candidate zoom previews associated with at least one bounding box around at least one specified one of the one or more target objects in the input image frame, and
display the one or more candidate zoom previews on the user interface adjacent to the zoom area and, for each of the one or more candidate zoom previews, the at least one bounding box around the at least one specified one of the one or more target objects in the input image frame.

9. The apparatus of claim 8, wherein, to determine the one or more candidate zoom previews for the one or more target objects proximate to the zoom area, the at least one processor is further configured to:
display an initial bounding box on the zoom area and a zoom range adjacent to the zoom area;
receive an input on the zoom range for a dimension of the initial bounding box; and
determine the one or more candidate zoom previews for the one or more target objects according to the dimension of the initial bounding box.

10. The apparatus of claim 8, wherein, to determine the one or more candidate zoom previews for the one or more target objects proximate to the zoom area, the at least one processor is further configured to:
expand a search for the one or more target objects related to the one or more candidate zoom previews from a center point of the zoom area until a threshold has been reached.

11. The apparatus of claim 10, wherein:
to determine the one or more candidate zoom previews for the one or more target objects proximate to the zoom area, the at least one processor is further configured to:
determine an optimal blob, and
determine a size of a bounding box for the optimal blob based on a size of the optimal blob; and
to display the one or more candidate zoom previews, the at least one processor is further configured to display a candidate zoom preview including the optimal blob and the bounding box for the optimal blob in the input image frame.

12. The apparatus of claim 8, wherein the at least one processor is further configured to:
receive a selected zoom preview from the one or more candidate zoom previews;
determine an optimal zoom rate that is inversely proportional to a size of the selected zoom preview in relation to a size of the input image frame; and
output the selected zoom preview magnified by the optimal zoom rate.

13. The apparatus of claim 8, wherein the at least one processor is further configured to:
receive a selected zoom preview from the one or more candidate zoom previews;
extract feature points from the at least one specified one of the one or more target objects associated with the selected zoom preview;
track the feature points in a temporal image sequence; and
maintain the feature points at a center of an output throughout the temporal image sequence.

14. The apparatus of claim 8, wherein, to receive the selection of the zoom area on the input image frame, the at least one processor is configured to:
display a touchpad on the user interface;
receive a manipulation of the touchpad;
move a cursor according to the manipulation; and
identify the selection of the zoom area based on a location of the cursor on the input image frame.

15. A non-transitory computer readable medium embodying a computer program, the computer program comprising computer readable program code that when executed causes at least one processor to:
receive a selection of a zoom area on an input image frame displayed on a user interface;
determine one or more candidate zoom previews for one or more target objects proximate to the zoom area using saliency detection, each of the one or more candidate zoom previews associated with at least one bounding box around at least one specified one of the one or more target objects in the input image frame; and
display the one or more candidate zoom previews on the user interface adjacent to the zoom area and, for each of the one or more candidate zoom previews, the at least one bounding box around the at least one specified one of the one or more target objects in the input image frame.

16. The non-transitory computer readable medium of claim 15, wherein the computer readable program code that when executed causes the at least one processor to determine the one or more candidate zoom previews for the one or more target objects proximate to the zoom area comprises computer readable program code that when executed causes the at least one processor to:
display an initial bounding box on the zoom area and a zoom range adjacent to the zoom area;

receive an input on the zoom range for a dimension of the initial bounding box; and determine the one or more candidate zoom previews for the one or more target objects according to the dimension of the initial bounding box.

17. The non-transitory computer readable medium of claim 15, wherein the computer readable program code that when executed causes the at least one processor to determine the one or more candidate zoom previews for the one or more target objects proximate to the zoom area comprises computer readable program code that when executed causes the at least one processor to:

expand a search for the one or more target objects related to the one or more candidate zoom previews from a center point of the zoom area until a threshold has been reached.

18. The non-transitory computer readable medium of claim 17, wherein:

the computer readable program code that when executed cause the at least one processor to determine the one or more candidate zoom previews for the one or more target objects proximate to the zoom area comprise computer readable program code that when executed cause the at least one processor to:
determine an optimal blob, and
determine a size of a bounding box for the optimal blob based on a size of the optimal blob, and the computer readable program code that when executed cause the at least one processor to display the one or more candidate zoom previews comprise computer readable program code that when executed cause the at least one processor to display a candidate zoom preview including the optimal blob and the bounding box for the optimal blob in the input image frame.

19. The non-transitory computer readable medium of claim 15, wherein the computer readable program code when executed further cause the at least one processor to:

receive a selected zoom preview from the one or more candidate zoom previews;

determine an optimal zoom rate that is inversely proportional to a size of the selected zoom preview in relation to a size of the input image frame; and output the selected zoom preview magnified by the optimal zoom rate.

20. The non-transitory computer readable medium of claim 15, wherein the computer readable program code when executed further cause the at least one processor to:

receive a selected zoom preview from the one or more candidate zoom previews;

extract feature points from the at least one specified one of the one or more target objects associated with the selected zoom preview;

track the feature points in a temporal image sequence; and maintain the feature points at a center of an output throughout the temporal image sequence.

\* \* \* \* \*